US012787078B2

(12) United States Patent
Sevindik

(10) Patent No.: US 12,787,078 B2
(45) Date of Patent: Nov. 3, 2026

(54) DEVICE ADDRESS BUNDLING FOR IOT COMMUNICATION

(71) Applicant: Charter Communications Operating, LLC, St. Louis, MO (US)

(72) Inventor: Volkan Sevindik, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 16 days.

(21) Appl. No.: 18/655,840

(22) Filed: May 6, 2024

(65) Prior Publication Data

US 2024/0292473 A1 Aug. 29, 2024

Related U.S. Application Data

(63) Continuation of application No. 17/185,132, filed on Feb. 25, 2021, now Pat. No. 11,979,924.

(51) Int. Cl.

*H04W 76/11* (2018.01)
*H04W 8/26* (2009.01)
*H04W 40/22* (2009.01)
*H04W 76/12* (2018.01)
*H04W 76/15* (2018.01)
*H04W 84/04* (2009.01)

(52) U.S. Cl.

CPC .............. *H04W 76/11* (2018.02); *H04W 8/26* (2013.01); *H04W 40/22* (2013.01); *H04W 76/12* (2018.02); *H04W 76/15* (2018.02); *H04W 84/045* (2013.01)

(58) Field of Classification Search

CPC ..... H04W 76/11; H04W 76/12; H04W 76/15; H04W 8/26; H04W 40/22; H04W 84/045

See application file for complete search history.

(56) References Cited

U.S. PATENT DOCUMENTS 8,718,688 B2 5/2014 Shaheen et al.
9,191,919 B2 11/2015 Bergqvist et al.
(Continued)

FOREIGN PATENT DOCUMENTS

CA 2941376 A1 * 3/2008 ............. G01D 4/004
CA 2725065 A1 * 11/2009 ......... F16K 37/0091
(Continued)

*Primary Examiner* — Saad A. Waqas
(74) *Attorney, Agent, or Firm* — Patent Beach PC

(57) ABSTRACT

Various embodiments comprise systems, methods, and apparatus enabling communications between a mobile network node (e.g., base station, eNB, gNB) and a large number of Internet of Things (IoT) devices by defining IoT device groups comprising at least one primary IoT device and a plurality of secondary IoT devices. The mobile network node communicates directly with group primary IoT devices via a mobile network protocol, and the group primary IoT devices further communicate with the secondary IoT devices via a local wireless protocol. Identifiers are used to identify secondary IoT devices that are the source of transmitted uplink messages, or the target/destination of downlink messages. Identifiers may be bundled or concatenated such that the primary IoT devices can manage messages or other communications to/from the base station, which in turn handles all backhaul services necessary to support the group of IoT devices.

20 Claims, 2 Drawing Sheets

(56) References Cited

U.S. PATENT DOCUMENTS

| | | | | |
|---|---|---|---|---|
| 10,021,537 | B2 | 7/2018 | Saeki | |
| 10,419,964 | B2 | 9/2019 | Shaheen | |
| 10,623,945 | B2 | 4/2020 | Lin et al. | |
| 2013/0201979 | A1 * | 8/2013 | Iyer | H04L 12/4679 370/338 |
| 2014/0161024 | A1 * | 6/2014 | Speight | H04W 52/221 370/315 |

FOREIGN PATENT DOCUMENTS

| | | | | | |
|---|---|---|---|---|---|
| CA | 2760394 | A1 | * | 11/2010 | H04L 12/12 |
| CA | 3097140 | A1 | * | 10/2019 | H04J 3/1652 |
| CA | 3100385 | A1 | * | 11/2019 | H04W 24/02 |
| CN | 107302781 | B | * | 1/2020 | H04W 48/04 |
| EP | 4080969 | A1 | * | 10/2022 | H04L 1/1812 |
| TW | 201737682 | A | * | 10/2017 | H04W 28/24 |
| WO | WO-2008033514 | A2 | | 3/2008 | |
| WO | WO-2011100497 | A1 | | 8/2011 | |
| WO | WO-2018028694 | A1 | * | 2/2018 | H04W 40/20 |
| WO | WO-2018059126 | A1 | * | 4/2018 | H04W 36/08 |
| WO | WO-2019226838 | A1 | | 11/2019 | |

* cited by examiner

DEVICE ADDRESS BUNDLING FOR IOT COMMUNICATION

PRIORITY

This application is a continuation of and claims priority to co-owned and co-pending U.S. patent application Ser. No. 17/185,132 filed on Feb. 25, 2021 entitled "DEVICE ADDRESS BUNDLING FOR IOT COMMUNICATION," and issuing as U.S. Pat. No. 11,979,024 on May 7, 2024, which is incorporated herein by reference in its entirety.

FIELD OF THE DISCLOSURE

The present disclosure generally relates to wireless communications systems and related networks, and more particularly to mechanisms enabling mobile networks operators to service large numbers of Internet of Things (IoT) devices.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The Internet of Things (IoT) refers to a myriad of devices configured to communicate with other devices (e.g., machine to machine or M2M) such as sensors, smart utility meters, alarms and the like. Many IoT devices communicate gathered information to wherever it may be usefully employed via other sensors, base stations, eNBs, gNBs and so on. IoT devices are becoming ubiquitous, but the communications infrastructure supporting IoT deployments is not keeping up. For example, current cellular communication systems were not designed to serve million of sensors in real time or near real-time. There are capacity issues arising while serving many IoT devices at the same time since base station resources are very limited.

SUMMARY

Various deficiencies in the prior art are addressed by systems, methods, and apparatus enabling communications between a mobile network node (e.g., base station, eNB, gNB) and a large number of Internet of Things (IoT) devices by defining IoT device groups comprising at least one primary IoT device and a plurality of secondary IoT devices. The mobile network node communicates directly with group primary IoT devices via a mobile network protocol, and the group primary IoT devices further communicate with the secondary IoT devices via a local wireless protocol. Identifiers are used to identify secondary IoT devices that are the source of transmitted uplink messages, or the target/destination of downlink messages. Identifiers may be bundled or concatenated such that the primary IoT devices can manage messages or other communications to/from the base station, which in turn handles all backhaul services necessary to support the group of IoT devices.

A method for managing communications of Internet of Things (IoT) devices according to one embodiment comprises: at a primary device of a group of IoT devices, in a first mode of operation, modifying a communication received from a source secondary device to further include a corresponding primary device identifier, and transmitting the modified communication toward a corresponding base station; and at the primary device of the group of IoT devices, in a second mode of operation, receiving a communication from the base station intended for delivery to a target secondary device, modifying the received communication to include the target secondary device identifier, and transmitting the modified communication toward the target secondary device. The method may further comprise, at the primary device, in a startup mode of operation, transmitting a communication including a location, a device identifier, and an indication of identifier bundling capability, the communication being configured for use by a base station defining IoT device groups proximate the base station, each IoT device group comprising a primary device and at least one secondary device, each device being associated with a respective identifier, each primary device being configured to support communications between the base station and the secondary devices.

A system according to an embodiment may comprise a base station of a mobile network configured to communicate with each of a plurality of primary Internet of Things (IoT) devices attached thereto via a mobile network protocol; each primary device communicating with a respective group of secondary devices via a local wireless protocol (LWP); each primary device, in a first mode of operation, modifying communications received from respective source secondary devices to further include a corresponding primary device identifier, and transmitting the modified communications toward a respective base station; each primary device, in a second mode of operation, receiving communications from a respective base station intended for delivery to target secondary devices, modifying each of the received communications to include an identifier of its target secondary device, and transmitting each modified communication toward its target secondary device.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
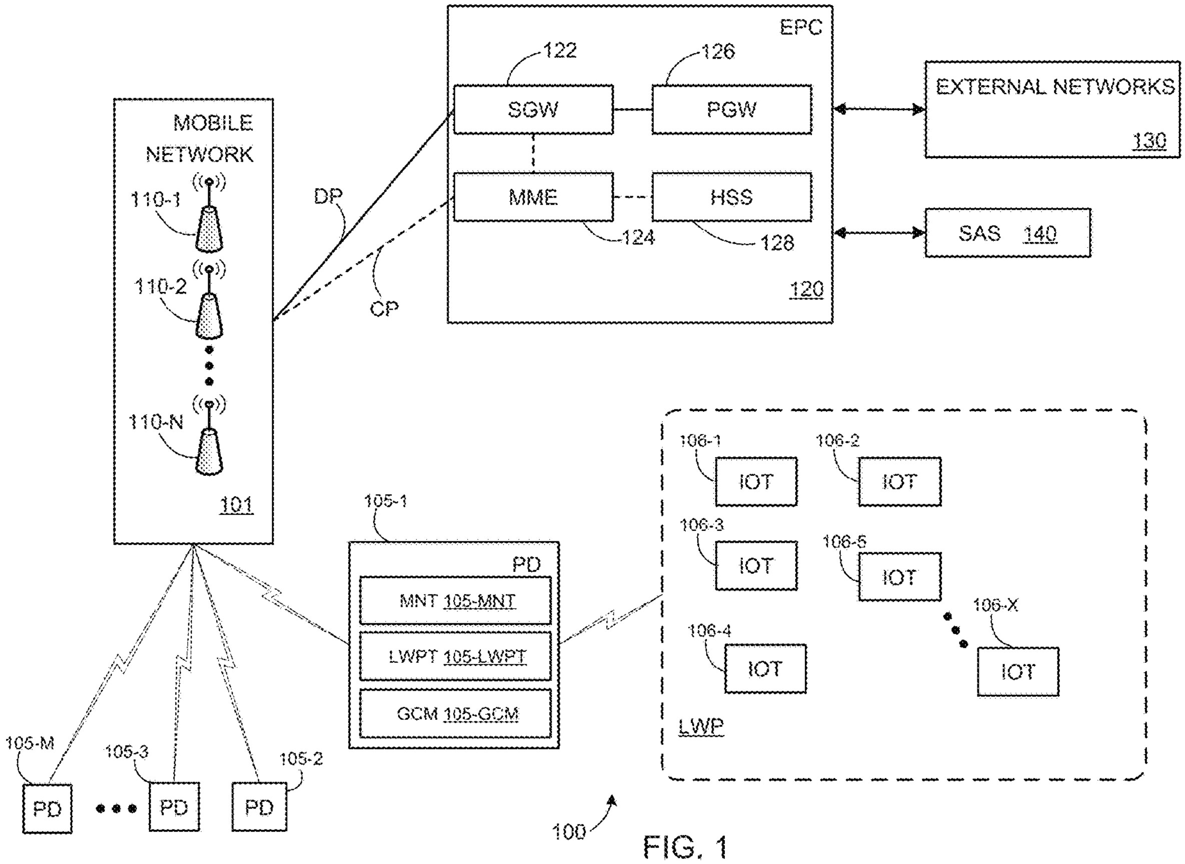
FIG. 1 depicts a block diagram of a network services architecture suitable for use in various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, “or,” as used herein, refers to a non-exclusive or, unless otherwise indicated (e.g., “or else” or “or in the alternative”). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments find particular utility within the context of networks configured to enable Internet of Things (IoT) devices to access services via a mobile network such as 4G/LTE/5G mobile networks using licensed or unlicensed spectral regions, but without overwhelming the mobile network management system. Specifically, the various embodiments contemplate a capacity to serve enormous numbers of IoT devices via a mobile network by logically defining IoT device groups wherein each group comprises a plurality of IoT devices communicating with, and receiving backhaul services from, a base station, cNB, gNB, WAP, or other network access device via a primary device IoT device associated with the group. In this manner, only a primary device in each group is managed by the mobile network management system rather than each of the individual non-primary IoT devices in the group. For example, various embodiments enable mobile network operators (MNOs) and others to provide communications services for larger numbers and differing types of IoT devices (e.g., low cost narrow-band devices, broadband devices, time-critical devices, etc.) and in accordance with a number of differing protocols (e.g., LTE-M, Cat-M1, NB-IoT, 5G, 5G NR, etc.).

The various embodiments are generally described as contemplating mobile network provider equipment communicating with primary IoT devices via a mobile network protocol, where each primary device communicates with a respective group of secondary IoT devices via a local wireless protocol. It should be noted that the primary IoT device may be implemented using communications devices that are not necessarily IoT devices. The primary devices may comprise IoT or non-IoT devices capable of communicating with the base station and with the secondary IoT devices. The primary devices operate to reduce some of the communications load otherwise borne by the base stations and may comprise any type of communications device capable of performing the primary device functions described herein.

FIG. 1 depicts a block diagram of a network services architecture suitable for use in various embodiments. Specifically, FIG. 1 depicts a network services architecture in which groups of Internet of Things (IoT) devices 106 (e.g., machine to machine devices, sensors, controllers, trackers, smart appliances, security devices and the like) utilize network services (e.g., streaming media upload/download, data upload/download, distribution of device programming, control and management messages, and so on) provided via respective group primary devices (PDs) communicatively coupled to a mobile network. The IoT devices 106 communicate with the PD 105 via a local wireless protocol (LWP), the PD 105 communicates with the mobile network via a mobile network protocol.

Referring to FIG. 1, a plurality of primary devices (PDs) 105-1 through 105-M (collectively PDs 105) are depicted as being configured for wirelessly communicating with a mobile network 101 (e.g., a LTE or 5G access network) formed as a plurality of base stations, gNBs, eNBs or other provider equipment (PE) mobile network nodes 110-1 through 110-N (collectively PE nodes 110). The mobile network 101 is connected to an evolved packet core (EPC) 120 configured to provide network services thereto, such as from/to external networks 130.

Referring to FIG. 1, a plurality of Internet of Things (IoT) devices 106-1 through 106-X (collectively IoT devices 106) are depicted as being configured for wirelessly communicating with a primary device 105-1 via a local wireless protocol (LWP), such as a WiFi network (e.g., 802.11xx network) or other wireless local area networks (WLANs), a Bluetooth (e.g., 802.15xx networks) or other wireless personal area networks (WPANs), and/or a combination of local networks, ad hoc networks and so on that are suitable for use in performing the various tasks described herein with respect to the embodiments.

In various embodiments, the PDs 105 and/or IoT devices 106 may also be configured for wirelessly communicating with WiFi Access Points (WAPs or APs) which are connected to an access network such as provided by a telecommunications, cable television, and/or other network services provider. The WAPs may comprise 802.11xx wireless access points at homes, businesses, or other locations.

The PE nodes 110 may comprise macrocells, small cells, microcells and the like such as eNodeBs (eNBs), cellular network base stations, 4G/5G repeaters, and similar types of provider equipment (PE) or logical radio nodes (e.g., gNBs) derived therefrom. The PE nodes 110 may include nodes that use licensed 3G/4G/LTE/5G spectrum, unlicensed spectrum such as citizens broadband radio service (CBRS) spectrum, or a combination of licensed and unlicensed spectrum. In the case of PE nodes 110 having Citizens Broadband Radio Service Device (CBSD) capability, allocations of CBRS spectrum are provided via a Spectrum Access System (SAS) 140 capable of adapting CBSD operation in accordance with government requirements, network congestion, network interference and the like.

Each PE node 110 provides network services to group PDs 105 via respective radio bearer (channels/resources) which are managed by various Radio Resource Management functions, such as Radio Bearer Control, Radio Admission Control, Connection Mobility Control, Scheduling of UEs in both uplink and downlink and so on. The Radio Resource Management functions are configured to provide appropriate Quality of Service (QOS) levels to each UE using one or more radio bearers, to maximize throughput at the PE nodes 110 while maintaining “fairness” to the PDs 106 attached thereto, to monitor various performance metrics, to provide data to the core network or network management entities and the like.

The PDs 106 may comprise any type of wireless device configured for use in accordance with the various embodiments, such as user terminals (e.g., mobile phones, laptops, tablets and the like), fixed wireless access devices (e.g., set top boxes, digital video recorders, stationary computing devices and the like), Internet of Things (IoT) devices (e.g., sensors, monitoring devices, alarm system devices and the like), and/or other wireless devices. The PDs 105 may be configured in various embodiments to use licensed 3G/4G/LTE/5G spectrum, unlicensed spectrum such as CBRS spectrum, or a combination of licensed and unlicensed spectrum such as discussed above with respect to CBSD PE nodes 110.

The various embodiments contemplate the PDs 106 are configured to communicate via at least one mobile network (MN) radio access technology (RAT) such as 3G, 4G/LTE, and 5G, and at least one local wireless protocol (LWP) technology such as WiFi (e.g., 802.11xx network) or other wireless local area networks (WLANs), Bluetooth (e.g., 802.15xx networks) or other wireless personal area networks (WPANs), and so on.

As depicted in FIG. 1, exemplary PD 105-1 comprises a mobile network transceiver 105-MNT configured for communications with any of PE nodes 110, a local wireless protocol transceiver 105-LWPT configured for communications with any of the IoT devices 106, and a group connection manager 105-GCM configured to manage communications with the PE nodes 110 and group of IoT devices 106, such as to facilitate address/identification translation functions as described below.

As depicted in FIG. 1, the EPC 120 comprises four network elements; namely, a Serving Gateway (SGW) 122, a Mobility Management Entity (MME) 124, a Packet Data Network (PDN) Gateway (PGW) 126, and a Home Subscriber Server (HSS) 128. Other network and management elements are typically included within and/or used to manage an evolved packet core, and related communications therewith as will be known to those skilled in the art.

The SGW 122 and PGW 126 handle user data or data plane (DP) functions; they transport internet protocol (IP) data traffic (i.e., incoming and outgoing packets) between the User Equipment (UE) 105 and the external networks 130. The external networks 130 may comprise any external network, such as an IP Multimedia Core Network Subsystem (IMS).

The SGW 122 is a point of interconnection between the radio-side (e.g., via a backhaul connection to the mobile network 101) and the EPC 120. As its name indicates, this gateway serves the UE by routing the incoming and outgoing IP packets. The SGW 122 is the anchor point for intra-LTE mobility (i.e. in case of handover between PE nodes 110) and between LTE, 5G, and other 3GPP accesses. The SGW 122 is logically connected to the PGW 126.

The PGW 126 is the point of interconnect for routing packets between the EPC 120 and external packet data networks (e.g., Internet Protocol (IP) networks) 330. The PGW also performs various functions such as IP address/IP prefix allocation, policy control and charging, and other functions.

The MME 124 and HSS 128 handle user signaling or control plane (CP) functions; they process signaling related to mobility and security for E-UTRAN 101 access. The MME 124 is responsible for the tracking and the paging of UE in idle-mode. It is the termination point of the Non-Access Stratum (NAS). The HSS 128 comprises a database that contains user-related and subscriber-related information, and provides support functions in mobility management, call and session setup, user authentication, access authorization, and other functions. It is noted that the SGW 122 may also be used to handle some control plane signaling in various configurations.

An EPC control plane signaling path CP may be used to provide information such as UE messages or signaling may be provided to the MME 124 or SGW 122. The MME 124 may also interact with various other EPC nodes, management elements, or functional elements such as the HSS 128 and SGW 122 to determine information helpful in generating reports and/or providing other information for managing the various networks in implementing the embodiments described herein.

As depicted in FIG. 1, a Spectrum Access System (SAS) 140 communicates with the EPC 120 and is configured to control access to the CBRS frequency band for RANs and other CBSD devices such as those operating as base stations, eNBs, gNBs or other PE nodes 110 and PDs 105. Generally speaking, the SAS 140 is configured to ensure that the CBRS frequency band is allocated in accordance with the regulations promulgated by the relevant authorities.

Various elements or portions thereof depicted in FIG. 1 and having functions described herein are implemented at least in part as computing devices having communications capabilities, including for example the UE 105, PE nodes 110, SAS 140, WC 150, WAP 160 and various portions of the EPC 120. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Bundled Addressing

The various embodiments contemplate servicing large groups of IoT devices/sensors via PE nodes 110 by defining a primary devices/sensors and associating the primary devices/sensors with respective groups of secondary devices/sensors. That is, PE nodes 110 communicate with primary devices/sensors, and primary devices/sensors relay communications to/from secondary sensors (optionally via intermediate devices/sensors communicatively disposed therebetween).

Each of the primary devices (PDs) 106 and IoT devices 105 is associated with a respective identifier, such as an International Mobile Subscriber Identity (IMSI), International Mobile Station Equipment Identity (IMEI) and the like. Other identifiers and/or addressing techniques may also be used.

The various embodiments use a bundling or concatenating of the primary and secondary (IoT) device identifiers for each message, where bundling and unbundling of device identifiers is performed by primary devices such that a bundled identifier for a message comprises a concatenation of the primary device and secondary device identifiers.

For example, a concatenated or bundled IMSI may be of the form "primary_imsi, secondary_imsi" while a concatenated or bundled IMEI may be of the form "primary_imei, secondary_imei" and so on. Further, it is noted that some embodiments may utilize primary, secondary, and tertiary IoT devices such that more than two identifiers may be concatenated/bundled and processed as described herein. For example, in an embodiment allowing the use of intermediate IoT devices for communicating between primary IoT devices and secondary devices IoT devices, a concatenated or bundled IMSI may be of the form "primary_imsi, intermediate_imsi-2, intermediate_imsi-1, secondary_imsi" where there are two intermediate IoT devices (i.e., a communications chain comprises links supported by the secondary IoT device, the first intermediate IoT device, the second IoT device, and the primary IoT device). IMEI and other identifiers may be adapted for use in a substantially similar manner.

In operation, an uplink message from a source device that traverses intermediate devices before transmission by a primary device may have the identifier of a current intermediate device in the sequence concatenated to a (growing) bundled address such that the message transmitted by the primary device may include the source, intermediate, and primary device identifiers.

Similarly, a downlink message received by a primary device that traverses intermediate devices before being received by a destination device may have the identifier of a current intermediate device in the sequence removed from the (shrinking) bundled address such that a current downlink message only includes the identifiers of the remaining intermediate devices and the ultimate destination device.

In some embodiments, non-primary devices communicate directly with one or more primary devices. In some embodiments, non-primary devices may communicate directly or indirectly with one or more primary devices, such as via intermediate devices.

In some embodiments, intermediate devices receiving an uplink or downlink message retransmit that message one or more times, but without changing any bundled or concatenated address therein.

In some embodiments, intermediate devices receiving an uplink message modify the uplink message to include the intermediate device identifier within the bundled identifier of the uplink message, and then retransmit the uplink message one or more times.

In some embodiments, intermediate devices receiving a downlink message having a bundled identifier including the intermediate device identifier remove their device identifier from the bundled identifier, and then retransmit the downlink message one or more times.

Figure 2:
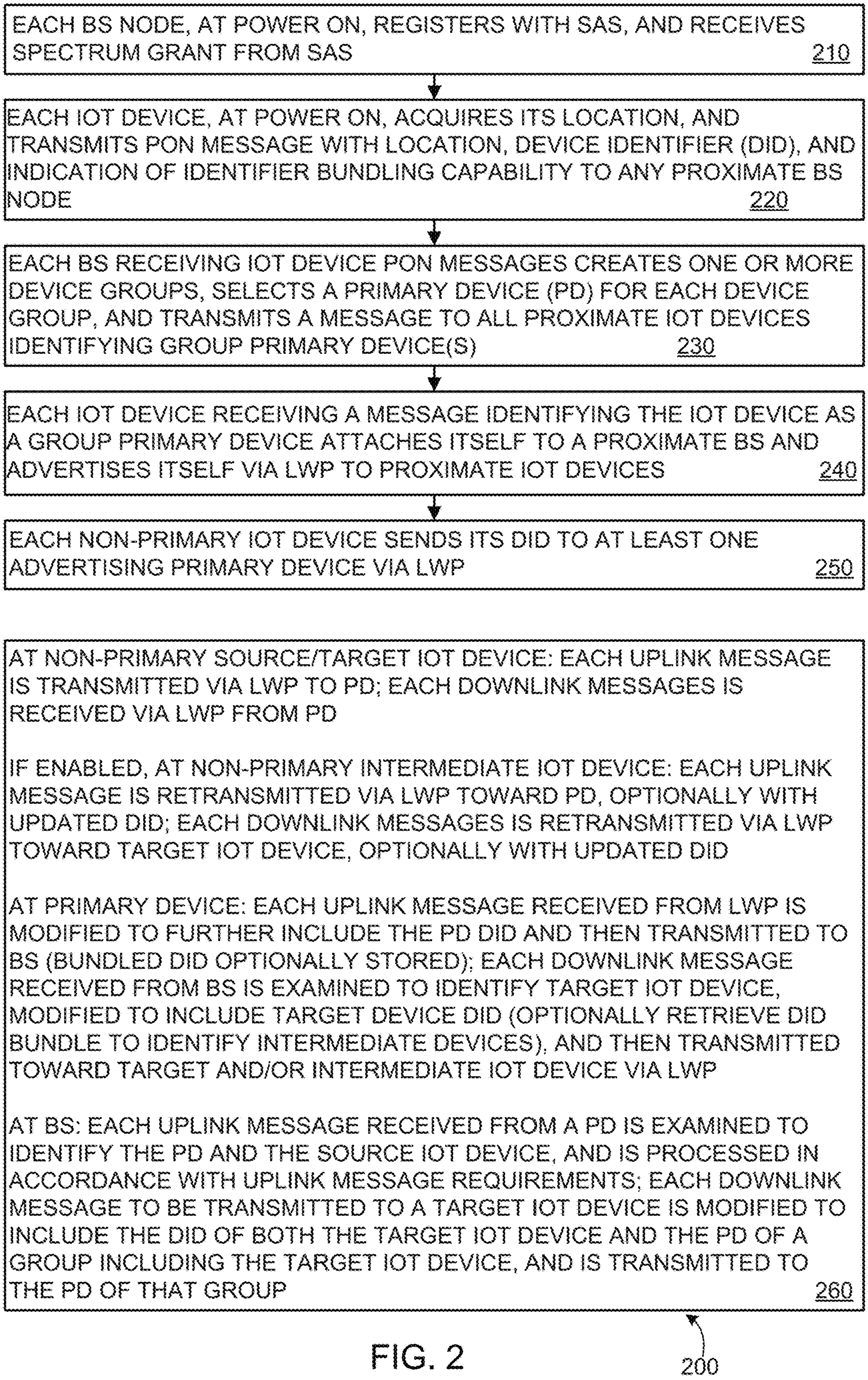
FIG. 2 depicts a flow diagram of method according to some embodiments.

FIG. 2 depicts a flow diagram of method according to some embodiments. Specifically, the method 200 of FIG. 2 depicts a flow diagram of exemplary power on (PON) and discovery operations (steps 210-250) and communications operations (step 260) associated with base stations, primary group IoT devices, and non-primary group IoT devices according to some embodiments.

At step 210, each base station or other PE node 110 (e.g., base station, eNB, gNB, CBSD, etc.) being powered up or initialized registers with the SAS 140 (if necessary) and receives a spectrum grant from the SAS 140 for use in communicating with PD 105 and for performing other functions as is known. In addition, the SAS 140 has defined a transmit power for use by the PE node 110, which defines a transmission coverage area associated with the PE node 110.

At step 220, each IoT device, at power on, acquires its location, and transmits a power on (PON) message with location, device identifier (DID), and an indication of identifier bundling capability to any proximate PE node 110. If the IoT device is capable of address bundling, then it may be used as either a primary IoT device servicing a group of secondary or non-primary IoT devices, or as a secondary/non-primary IoT device within a group of IoT devices. If the IoT device is not capable of address bundling, then it may be used only as a secondary/non-primary IoT device, such as within a group of IoT devices.

In various embodiments, only address bundling capable IoT devices (i.e., primary IoT devices) are capable of communicating via the mobile network protocol used by PE nodes. Secondary/non-primary devices are only capable of communicating via the LWP network. In various embodiments, some of the secondary/non-primary devices are capable of communicating via the mobile network protocol used by the relevant PE nodes 110 (e.g., base station, eNB, gNB, CBSD, etc.).

At step 230, each PE node 110 receiving an IoT device PON message assigns the IoT device associated with the received message to a newly created or existing group of IoT devices, where each group comprises a primary IoT device and at least one secondary/non-primary IoT device. The PE node 110 transmits a message to some or all of the proximate IoT devices, such as the device that transmitted the received PON message, identifying one or more primary devices.

At step 240, each IoT device receiving a message identifying the IoT device as a group primary device in turn attaches itself to a proximate PE node 110 and advertises itself as a primary device to proximate secondary/non-primary devices via a local wireless protocol (e.g., WiFi, Bluetooth, etc.).

At step 250, each non-primary IoT device sends its DID to at least one advertising primary device via the LWP.

The above-described steps 210-250 depict power-on or initialization operating modes for PE nodes 110, primary IoT devices 105, and secondary/non-primary IoT devices 105 in accordance with various embodiments.

Step 260 depicts a IoT communications protocol. Specifically, each of the PE nodes 110, primary IoT devices 105, and secondary/non-primary IoT devices 105 further operate in either of an uplink mode (convey data from IoT devices 105/106 to a PE node 110) or a downlink mode (convey data from a PE node 110 to IoT devices 105/106). Step 260, alone and/or in combination with other portions of the instant specification, describe these modes of operation.

At step 260, a secondary/non-primary IoT device 105 in an uplink mode of operation transmits a message or other data toward a primary IoT device. The message or data may include the DID of the secondary/non-primary IoT device if needed.

At step 260, a secondary/non-primary IoT device in a downlink mode of operation receives a message or other data from a primary IoT device. The message or data may include the DID of the secondary/non-primary IoT device if needed.

In one embodiment, when a secondary/non-primary IoT device 105 wishes to communicate with a primary IoT device 106 it transmits a "communications request" including its DID (e.g., IMSI, IMEI, etc.) and the message or other data to the primary IoT device 106. In response to a "communications request acknowledgement" from the primary IoT device 106 a communications channel between the requesting IoT device 105 and primary IoT device 106 may be provided. This communications channel may be further defined by the requesting IoT device 105 and/or primary IoT device 106 optionally storing a bundled DID indicative of any secondary/non-primary IoT devices 105 (i.e., intermediate IoT devices) that may be used to convey messages between the requesting IoT device 105 and primary IoT device 106.

At step 260, if intermediate device usage is enabled, an intermediate IoT device receives an uplink message or data transmitted from a secondary/non-primary IoT device 105 that is intended for a primary IoT device 106, and retransmits the uplink message or other data toward the primary IoT device. Optionally, the message or data may be modified to further include the DID of the intermediate IoT device.

At step 260, if intermediate device usage is enabled, an intermediate IoT device receives a downlink message or data transmitted from a primary IoT device 106 that is intended for a target secondary/non-primary IoT device 105, and retransmits the downlink message or other data toward the target secondary/non-primary IoT device 105. Optionally, the message or data may be modified to further remove the DID of the intermediate IoT device.

In various embodiments, each data packet that a secondary/non-primary IoT device 105 transmits contains the DID of that sensor in its header. In situations where the uplink message or data may pass through multiple secondary or primary IoT devices, each such device may add or concatenate its DID onto the existing DID of the message such that the source IoT device and intermediate IoT devices may be known.

At step 260, a primary IoT device 106 in an uplink mode of operation receives an uplink message or other data from a secondary/non-primary IoT device. The received uplink message or other data is modified to include the DID of both the primary IoT device and the secondary/non-primary IoT device (i.e., the source IoT device). The modified uplink message or other data is transmitted to the PE nodes 110 to which the primary IoT device is attached.

At step 260, a primary IoT device in a downlink mode of operation receives a downlink message or other data from a PE node 110 that is intended for delivery to a secondary/non-primary IoT device. The received downlink message or other data is examined to identify the target IoT device. The received downlink message or other data is modified to include the DID of the target IoT device and is transmitted toward the target IoT device.

At step 260, a PE node 110 in an uplink mode of operation receives an uplink message or other data from a primary IoT device. The received uplink message or other data is examined to identify the source IoT device, and is processed in accordance with the requirements of the received uplink message or other data (e.g., message/data transmitted to destination as indicated).

In various embodiments, where the uplink message or data may pass through multiple secondary or primary IoT devices, each such device may have added or concatenated its DID onto the existing DID of the message such that the source IoT device and intermediate IoT devices may be known. In these situations, the PE node 110 stores the concatenated DID string associated with the uplink message or data such that any subsequently received message or data intended for the source IoT device may be transmitted via the reverse sequency of IoT devices.

At step 260, a PE node 110 in an downlink mode of operation receives a downlink message or data to be transmitted to a target secondary/non-primary IoT device (e.g., command/programming data, streaming media, etc.). The PE node 110 identifies the primary device(s) associated with the group(s) including the target secondary/non-primary IoT device. For each group including the target secondary/non-primary IoT device, the PE node 110 modifies the downlink message or data to include the DID of both the primary device associated with the group and the DID of the target secondary/non-primary IoT device, and transmits the modified downlink message or data toward the primary device associated with the group.

In various embodiments, where the downlink message or data is associated with a concatenated DID group, that DID group is retrieved from PE node 110 memory and used, in reverse order, to modify the downlink message or such that any subsequently downlink message or data intended for the target IoT device may be transmitted via the reverse sequency of IoT devices.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. Computerized apparatus configured to obtain data relating to use of one or more air interfaces within a premises, the computerized apparatus comprising: processor apparatus; and storage apparatus in data communication with the processor apparatus and comprising at least one computer program, the at least one computer program comprising a plurality of instructions which are configured to, when executed by the processor apparatus, cause the computerized apparatus to: receive, via one or more intermediate user devices of a plurality of user devices, a first communication originating from a source secondary IoT user device via a local wireless protocol (LWP); modify the first communication to form a concatenated message comprising (i) one or more identifiers of the one or more intermediate user devices, respectively, (ii) a device identifier of the computerized apparatus, and (iii) a secondary device identifier of the source secondary IoT user device; and transmit the concatenated message toward a base station via a mobile network protocol.

2. The computerized apparatus of claim 1, wherein the plurality of instructions which are configured to, when executed by the processor apparatus, cause the computerized apparatus to: receive, via at least one intermediate user device, a second communication originating from the base station intended for delivery to a target secondary IoT user device, the second communication comprising a second concatenated message comprising (i) at least one identifier of the at least one intermediate user device, respectively, (ii) a device identifier of the computerized apparatus, and (iii) a target secondary device identifier of the target secondary IoT user device; modify the received second communication to remove (i) the at least one identifier of the at least one intermediate user device, respectively, and (ii) the device identifier of the computerized apparatus, such that the modified second communication includes only the target secondary device identifier, and transmit the modified second communication toward the target secondary IoT user device.

3. The computerized apparatus of claim 1, wherein:

the computerized apparatus communicates with the base station via the mobile network protocol; and the source secondary IoT user device comprises an Internet of Things (IoT) device configured to communicate with the computerized apparatus via the local wireless protocol (LWP).

4. Computer readable apparatus comprising a non-transitory storage medium, the non-transitory storage medium comprising at least one computer program having a plurality of instructions configured to, when executed on a processing apparatus of a computerized device, cause the computerized device to: receive, via at least one intermediate user device, a communication originating from a base station via a mobile network protocol that is intended for delivery to a target secondary Internet of Things (IoT) device, the communication comprising a concatenated message comprising (i) at least one identifier of the at least one intermediate user device, respectively, (ii) a device identifier of the computerized device, and (iii) a target secondary IoT device identifier of the target secondary IoT device; modify the received communication to remove (i) the at least one identifier of the at least one intermediate user device, respectively, and (ii) the device identifier of the computerized device, and transmit the modified communication via a local wireless protocol (LWP) toward the target secondary IoT device.

5. The computer readable apparatus of claim 4, wherein the concatenated message further comprises at least one other identifier of at least one other respective user device downstream from the computerized device, and the modified communication includes both (i) the at least one other identifier of the at least one other user device downstream from the computerized device, and (ii) the target secondary IoT device identifier of the target secondary IoT device.

6. The computer readable apparatus of claim 4, wherein: the transmission of the modified communication toward the target secondary IoT device comprises transmission of the modified communication to one or more intermediate user devices; and modification of the received communication further comprises addition of one or more respective device identifiers of the one or more intermediate user devices thereto.

7. A method for managing communications of a plurality of Internet of Things (IoT) devices in a wireless communication system, the method comprising: at a primary device associated with the plurality of IoT devices, establishing a communication link with a base station via a mobile network protocol; receiving, from one or more secondary IoT devices in the plurality via a local wireless protocol, respective device identifiers and data; forming a bundled identifier set comprising a primary device identifier and the respective device identifiers of the one or more secondary IoT devices; transmitting the bundled identifier set and associated data to the base station via the mobile network protocol; receiving, from the base station, downlink data that is intended for delivery to at least one of the one or more secondary IoT devices, the downlink data including the bundled identifier set; and modifying the downlink data to retain an identifier of the at least one secondary IoT device, and transmitting the modified downlink data to the at least one secondary IoT device via the local wireless protocol.

8. The method of claim 7, wherein the base station comprises a Citizens Broadband Radio Service Device (CBSD) operating in coordination with a Spectrum Access System (SAS).

9. The method of claim 7, wherein the mobile network protocol comprises 5G New Radio (NR).

10. The method of claim 7, wherein the primary device is configured to aggregate data from a plurality of secondary devices comprising sensors, controllers, or monitoring devices.

11. The method of claim 7, wherein the local wireless protocol comprises at least one of an 802.11xx protocol or an 802.15xx protocol.

12. The method of claim 7, wherein the primary device is configured as a fixed installation that communicates with a plurality of geographically distributed secondary devices via the local wireless protocol.

13. The method of claim 7, wherein the bundled identifier set includes identifiers for multiple secondary devices that are each located at respective remote sites served by the primary device.

14. The method of claim 7, wherein the primary device is configured for use in a mobile platform comprising multiple secondary devices that communicate with the primary device via the local wireless protocol during movement of the mobile platform.

15. The method of claim 7, wherein the local wireless protocol comprises a wireless local area network (WLAN) or wireless personal area network (WPAN) protocol configured for communications between the primary device and secondary devices within a premises.

16. The method of claim 7, further comprising processing, at the primary device, at least a portion of data received from the one or more secondary IoT devices to generate aggregated information prior to transmission to the base station.

17. The method of claim 7, wherein the primary device is configured to determine, based on a capability indication received from a secondary device, whether the secondary device is authorized for inclusion in a device group.

18. The method of claim 7, wherein the bundled identifier set transmitted to the base station includes, for each secondary IoT device, a corresponding capability indication.

19. The method of claim 7, wherein: at power-on, each IoT device acquires its location and transmits a power-on (PON) message including the location, a device identifier (DID), and an indication of identifier bundling capability to any proximate provider equipment (PE) node; and an IoT device determined to have address bundling capability is configured for operation as either a primary IoT device servicing a plurality of secondary IoT devices or as a secondary IoT device within the plurality of IoT devices, and an IoT device without the address bundling capability is configured for operation only as a secondary IoT device.

20. The method of claim 7, wherein at least one intermediate device in a communication path between the primary device and a secondary device is configured to forward a communication without modifying a bundled identifier included in the communication.

* * * * *